United States Patent
Witarsa et al.

(10) Patent No.: US 10,843,123 B2
(45) Date of Patent: Nov. 24, 2020

(54) DUAL SYSTEM PROCESS FOR AMMONIA VAPOR RECOVERY

(71) Applicants: University of Maryland, College Park, College Park, MD (US); Andrew Moss, Pocomoke City, MD (US)

(72) Inventors: Freddy Witarsa, College Park, MD (US); Robert Lupitskyy, Burtonsville, MD (US); Stephanie Lansing, Hyattsville, MD (US); Andrew Moss, Pocomoke City, MD (US)

(73) Assignees: University of Maryland, College Park, Waldorf, MD (US); Planet Found Energy Development, LLC, Pocomoke City, MD (US)

( * ) Notice: Subject to any disclaimer, the term of this patent is extended or adjusted under 35 U.S.C. 154(b) by 263 days.

(21) Appl. No.: 15/971,832

(22) Filed: May 4, 2018

(65) Prior Publication Data
US 2018/0318754 A1    Nov. 8, 2018

Related U.S. Application Data

(60) Provisional application No. 62/502,370, filed on May 5, 2017.

(51) Int. Cl.
*C01C 1/26*   (2006.01)
*B01D 53/14*  (2006.01)
*B01D 53/58*  (2006.01)

(52) U.S. Cl.
CPC ......... *B01D 53/1475* (2013.01); *B01D 53/58* (2013.01); *C01C 1/26* (2013.01);
(Continued)

(58) Field of Classification Search
CPC .......... B01D 53/1475; B01D 2252/102; B01D 2257/102; B01D 2257/504; C01C 1/26
See application file for complete search history.

(56) References Cited

U.S. PATENT DOCUMENTS

| 1,897,725 A * | 2/1933 | Schunck ................ B01D 53/62 |
| | | 423/419.1 |
| 6,368,849 B1 | 4/2002 | Norddahl |
| | | (Continued) |

FOREIGN PATENT DOCUMENTS

DE            280044 A1 *   6/1990    ............. B01D 53/14

OTHER PUBLICATIONS

Machine English translation of DD280044A1.*

*Primary Examiner* — Richard M Rump

(57) ABSTRACT

A method for recovering ammoniacal nitrogen, in the form of ammonium carbonate and/or ammonium bicarbonate, from an ammoniacal nitrogen-containing vapor that comprises introducing said vapor into at least one pressurizable ammonia scrubbing vessel containing water, simultaneously introducing a carbon dioxide-containing vapor into at least one pressurizable carbon dioxide scrubbing vessel containing water, and simultaneously pumping the solutions created in said scrubbers via hydrologic connections between said scrubbers to mix the solution to create an ammonium carbonate and/or ammonium bicarbonate containing mixture, all while maintaining independent and unmixed vapor streams throughout the entire process. The method further involves recovering ammonium carbonate and/or ammonium bicarbonate from the mixture for further use.

15 Claims, 2 Drawing Sheets

(52) U.S. Cl.
CPC .. *B01D 2251/606* (2013.01); *B01D 2252/102* (2013.01); *B01D 2252/103* (2013.01); *B01D 2257/102* (2013.01); *B01D 2257/406* (2013.01); *B01D 2257/504* (2013.01)

(56) References Cited

U.S. PATENT DOCUMENTS

| | | |
|---|---|---|
| 7,160,456 B2 | 1/2007 | Järventie |
| 7,381,389 B2 | 6/2008 | Harada et al. |
| 7,811,455 B2 | 10/2010 | Burke |
| 8,496,897 B2 * | 7/2013 | Hunwick ............... B01D 53/62 423/230 |
| 8,580,219 B2 * | 11/2013 | Hickey .................... C01C 1/26 210/603 |
| 8,613,894 B2 | 12/2013 | Zhao et al. |

* cited by examiner

DUAL SYSTEM PROCESS FOR AMMONIA VAPOR RECOVERY

CROSS-REFERENCE TO RELATED APPLICATION

This application claims priority to U.S. Provisional Patent Application No. 62/502,370, filed on May 5, 2017, the entirety of which is hereby incorporated by reference.

BACKGROUND

Field of the Invention

The present invention generally relates to nutrient recovery processes and, more specifically, to a method and system for recovering ammoniacal nitrogen from an ammoniacal nitrogen-containing vapor.

Background

Agricultural and industrial processes, including manure and wastewater management, livestock rearing, cement making, and chemical, pulp and paper production, produce ammoniacal nitrogen as a waste product, which can be discharged to the environment with detrimental effects. Atmospheric ammonia can react with $SO_2$ and $NO_x$ to form particulate pollutants, which can further pose risks to human health or lead to deposition away from the source, leading to environmental nutrient pollution. Similarly, biochemical redox processes affecting ammonia can generate $NO_2$, a strong greenhouse gas. In addition to the potentially detrimental health and environmental consequences, the release of ammoniacal nitrogen from agriculture and industry also incurs costs in the form of regulations and represents the loss of a commercially valuable nutrient. For these reasons, the recovery of ammoniacal nitrogen from agricultural and industrial processes is desirable.

SUMMARY

One objective of the present invention is to process ammoniacal nitrogen-containing vapors and recover a concentrated nitrogenous mixture or solid nitrogenous product therefrom.

In view of the state of the known technology, one aspect of the present disclosure is to provide an ammoniacal nitrogen vapor processing system with an ammoniacal nitrogen scrubbing section, a carbon dioxide scrubbing section, and a hydrological connection section that hydrologically connects the ammoniacal nitrogen scrubbing section and the carbon dioxide scrubbing section. The ammoniacal nitrogen scrubbing section includes at least one pressurizable water holding vessel configured to scrub ammoniacal nitrogen from ammoniacal nitrogen-containing vapors. The carbon dioxide scrubbing section includes at least one pressurizable vessel configured to scrub carbon dioxide from carbon dioxide-containing vapors. The hydrological connection section includes at least one hydrologic connection between the ammoniacal nitrogen scrubbing section and the carbon dioxide scrubbing section configured to provide mixing between the solutions in the ammonia scrubbing system and the carbon dioxide scrubbing system and result in the creation of an ammonium carbonate and/or ammonium bicarbonate containing mixture from which the ammonium salts can be recovered for further use.

BRIEF DESCRIPTION OF THE DRAWINGS

Referring now to the attached drawings which form a part of this original disclosure.

DETAILED DESCRIPTION THE INVENTION

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

A description is provided below of an ammoniacal nitrogen recovery system 12. Thereafter, a description is provided for one combination of processes performed to recover ammoniacal nitrogen from an ammoniacal nitrogen-containing vapor using the ammoniacal nitrogen recovery system 12.

Figure 1:
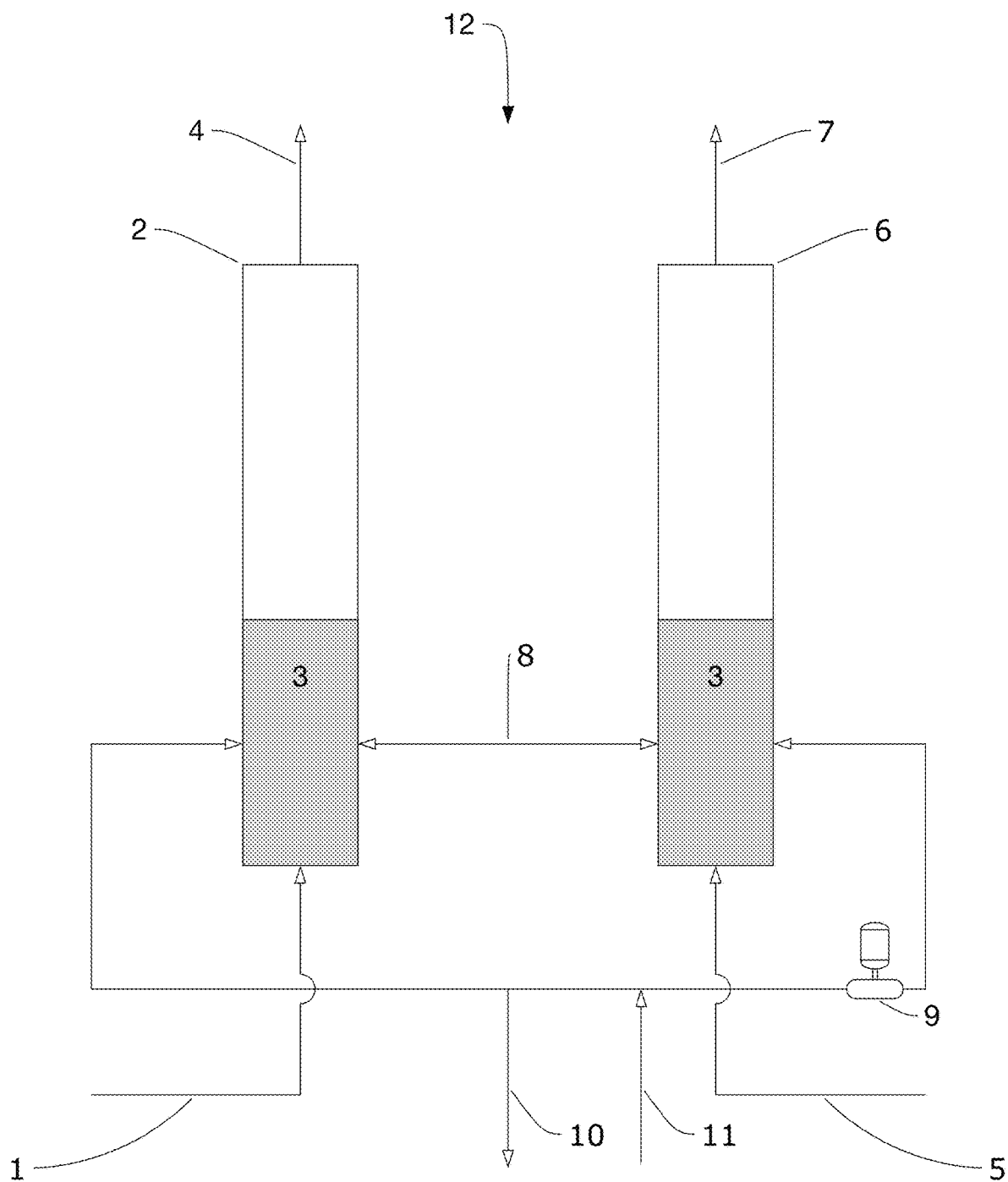
FIG. 1 is an overall schematic diagram of the basic embodiment of the ammoniacal nitrogen recovery process described herein.

Referring initially to FIG. 1, a schematic diagram showing portions of the ammoniacal nitrogen recovery system 12 for processing the ammoniacal nitrogen-containing vapor 1, is illustrated in accordance with a first embodiment.

The ammoniacal nitrogen recovery system 12 is a flexible system that can be used to process a variety of ammoniacal nitrogen-containing vapors using a variety of processes. However, in the description below, one example of the many possible combinations of processes that can be conducted by the ammoniacal nitrogen recovery system 12 is described. The combinations of processes described herein below make use of the ammoniacal nitrogen recovery system 12 to process and transform the ammoniacal nitrogen present as part of the ammoniacal nitrogen-containing vapors 1 into an ammonium carbonate and/or ammonium bicarbonate containing product 11. It should be understood from the drawings and the description herein that the ammoniacal nitrogen recovery system 12 can be used to conduct any of a variety of combination of processing steps and operations, and is not limited to usage with the combination of processes described herein below.

As used herein below, the term "ammoniacal nitrogen-containing vapors 1" can include any of a variety of vapors. However, for purposes of understanding the invention, the ammoniacal nitrogen-containing vapors 1 described below can be vapors discharged from organic waste streams such as human municipal waste and livestock manures.

As used herein below, the term "carbon dioxide-containing vapors 5" can include any of a variety of vapors. However, for purposes of understanding the invention, the carbon dioxide-containing vapors 5 described below can be vapors produced by anaerobic digestion systems processing any number of organic wastes.

As shown in FIG. 1, ammoniacal nitrogen containing vapors 1 are delivered to the ammoniacal nitrogen recovery system 12 via any number of mechanisms. For example, a blower, compressor or fan can convey ammoniacal nitrogen containing vapors 1 from a point of origin to the ammoniacal nitrogen recovery system 11. Since vapor conveyance via blowers, compressors, and fans is a conventional mechanical process, further description is omitted for the sake of brevity.

The ammoniacal nitrogen-containing vapor 1 is delivered into one or a plurality of pressurizable ammonia scrubbing vessel(s) 2 containing a water-based solution 3 in order to entrain and dissolve ammoniacal nitrogen in said solution and produce effluent vapor stream(s) 4 containing a reduced quantity of ammoniacal nitrogen. A carbon dioxide-containing vapor 5 is concurrently delivered into one or a plurality of pressurizable carbon dioxide scrubbing vessel(s) 6 via any number of mechanisms, as described in the ammoniacal nitrogen-containing vapor conveyance process detailed above. The carbon dioxide-containing vapor 5 is delivered to the carbon dioxide scrubbing vessel(s) 6, which contain a water-based solution 3 in which carbon dioxide becomes entrained and dissolves, producing effluent vapor stream(s) 7 containing a reduced quantity of carbon dioxide. The water-based solution 3 is mixed and circulated via one or more hydrologic connections 8 between the ammoniacal nitrogen scrubbing vessel(s) 2 and the carbon dioxide scrubbing vessel(s) 6 using any variety of pumps or pumping mechanisms 9 to produce an ammonium carbonate and/or ammonium bicarbonate containing mixture in accordance with the equations $2NH_3+H_2O+CO_2=(NH_4)_2CO_3$ and $NH_3+H_2O+CO_2=(NH_4)HCO_3$. The said ammonium salt mixture can then undergo a recovery process to recover said an ammonium carbonate and/or ammonium bicarbonate containing product 11 for further use in a variety of agricultural and commercial applications, while additional water-based solution may be added as make-up 11 for said solution due to loss via volatilization and/or said product recovery. The use of the separate and distinct ammoniacal nitrogen scrubbing vessel(s) 2 and carbon dioxide scrubbing vessel(s) 6 allows the ammoniacal nitrogen-containing vapor 1 and carbon dioxide-containing vapor 5 to be passed through the same water-based solution 3 without being mixed.

Figure 2:
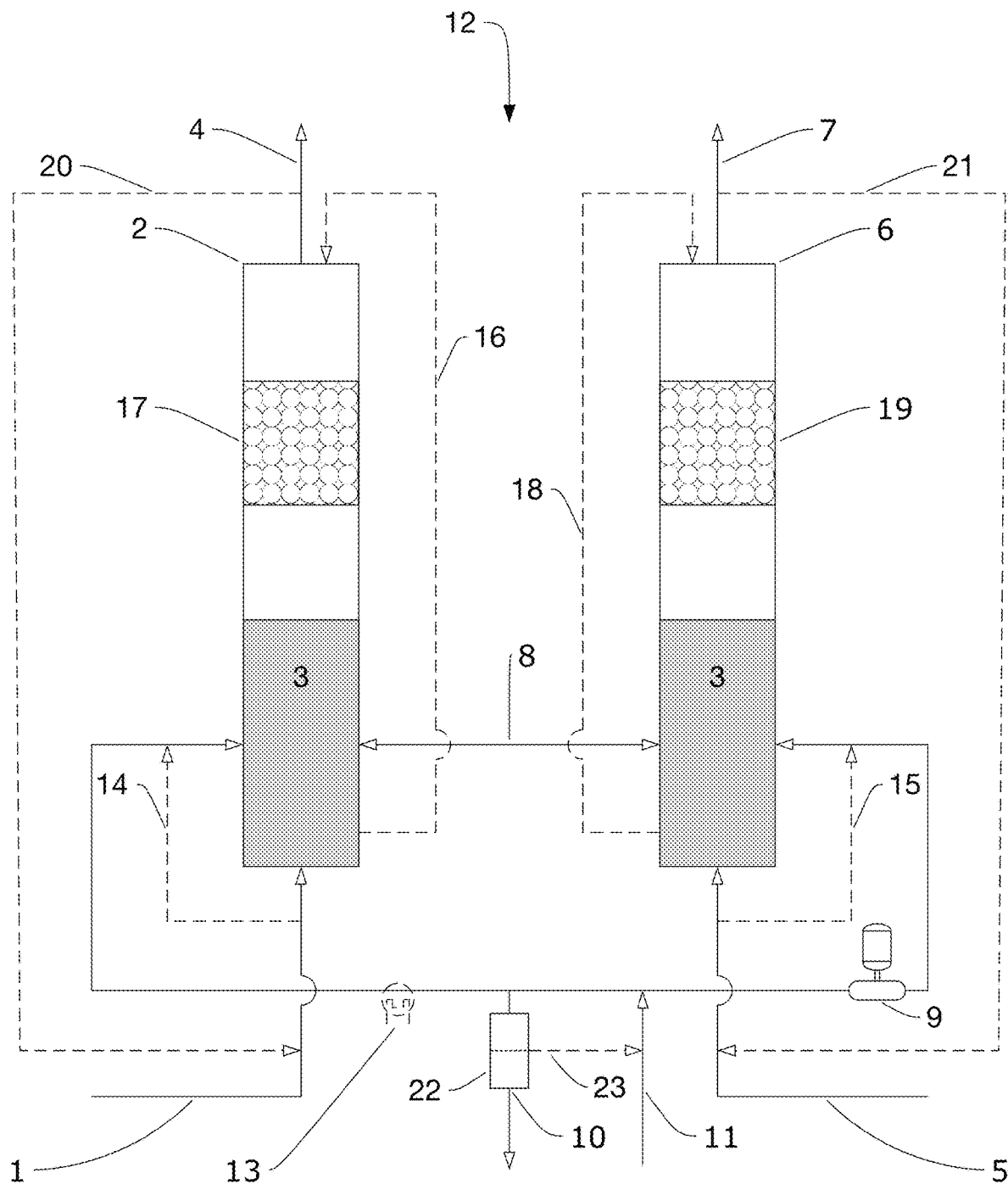
FIG. 2 is a schematic diagram of the preferred embodiments of the ammoniacal nitrogen recovery process described herein, with dashed lines representing preferred alternative embodiments.

FIG. 2 presents additional preferred embodiments, described below, that may be used individually or in any variety of combinations depending on the process application. In one of the additional embodiments, the water-based solution 3 being circulated between the ammoniacal nitrogen scrubbing vessel(s) 2 and the carbon dioxide scrubbing vessel(s) 6 can be cooled, through a variety of heat exchange mechanisms 13, to maintain a temperature less than 30° C., or preferably less than 10° C., since gas solubility in water is indirectly proportional to said water's temperature. A second additional preferred embodiment includes the entrainment 14 of the ammoniacal nitrogen-containing vapor 1 into the water-based solution 3 being pumped into the ammoniacal nitrogen scrubbing vessel(s) 2, while a third additional preferred embodiment includes the entrainment 15 of the carbon dioxide-containing vapor 5 into the water-based solution 3 being pumped into the carbon dioxide scrubbing vessel(s) 6. The second and third additional preferred embodiments improve the efficiency of the conversion of ammoniacal nitrogen-containing vapor 1 and carbon dioxide-containing vapor 5 to the ammonium carbonate and/or ammonium bicarbonate mixture by increasing the mixing time between said vapor(s) and the water-based solution 3. A fourth additional preferred embodiment includes the circulation 16 of the water-based solution 3 within the ammoniacal nitrogen scrubbing vessel(s) 2 or, similarly, the circulation 18 of the water-based solution 3 within the carbon dioxide scrubbing vessel(s) 6, which enhances the retention of ammoniacal nitrogen and carbon dioxide by increasing the available surface area of the water-based solution 3 as well as the interaction time between said solution and the ammoniacal nitrogen-containing vapor 1 and/or carbon dioxide-containing vapor 5. The water-based solution 3 can be circulated using any variety of pumps and/or pumping mechanisms (not shown). The process described in the fourth additional preferred embodiment can be further modified to incorporate media 17 into the ammoniacal nitrogen scrubbing vessel(s) 2 and/or the same or different media 19 into the carbon dioxide scrubbing vessel(s) 6. The media(s) 17 and 19 may include packing material(s) and/or sieve plates, impingement plates, bubble plates and/or valve plates, and serve the purpose of increasing the available surface area of the water-based solution 3 as well as the interaction time between said solution and the ammoniacal nitrogen-containing vapor 1 and/or carbon dioxide-containing vapor 5. A fifth additional preferred embodiment is to recirculate the effluent vapors of the ammonia recovery process 12 into their respective scrubbing systems. The vapor stream(s) 4 emanating from the ammoniacal nitrogen scrubbing vessel(s) 2 can be recirculated 20 back into the ammoniacal nitrogen scrubbing vessel(s) 2 to constitute a part or the entirety of the influent ammoniacal nitrogen-containing vapor 1, thereby allowing for more complete removal of ammoniacal nitrogen in the process. Similarly, the vapor stream(s) 7 emanating from the carbon dioxide scrubbing vessel(s) 6 can be recirculated 21 back into the carbon dioxide scrubbing vessel(s) 6 to constitute a part or the entirety of the influent carbon dioxide-containing vapor 5, which allows for more complete removal of carbon dioxide in the process. The vapor stream(s) 4 and 7 can be circulated using any variety of pumps and/or pumping mechanisms. In a sixth additional preferred embodiment, the recirculation of vapors described in the fifth additional preferred embodiment can be monitored and controlled, allowing for metered delivery of ammoniacal nitrogen-containing vapor 1 and carbon dioxide-containing vapor 5 to their respective scrubbers in proportion to the stoichiometric ratios of the ammonium carbonate and/or ammonium bicarbonate containing product 11. In a seventh additional preferred embodiment, gravity settling, centrifusion, and/or filtration mechanisms 22 can be incorporated into the recovery of the ammonium carbonate and/or ammonium bicarbonate containing product 11 in order to create a concentrated form of said recovered ammonium salts and/or to reintroduce water 23 devoid of said salts back into the water-based solution 3. Since gravity settling, centrifusion, and/or filtration systems such as reverse osmosis apparatus are conventional features, further description is omitted for the sake of brevity.

DESCRIPTION OF THE RELATED ART

The stripping of ammonia from liquid organic waste according to Norddahl (U.S. Pat. No. 6,368,849 B1) involves the separation of a substantially particle free permeate from anaerobically digested organic wastes via methods such as ultrafiltration, subjecting said permeate to ammonia stripping at elevated temperatures to drive ammonia/carbon dioxide into a gas form and divide said permeate into ammonia/carbon dioxide and nutrient salt fractions, and the removal of the precipitated ammonia/carbon dioxide in the form of an ammonium salt. Our process differs by maintaining an ammoniacal-nitrogen containing vapor and a carbon dioxide-containing vapor as two separate vapors, allowing for processing of said vapors without contamination or dilution. Furthermore, the individual delivery of ammoniacal-nitrogen containing vapor and carbon dioxide-containing vapor in our system allows for more precise control of ammonium carbonate and/or ammonium bicarbonate formation.

Järventie (U.S. Pat. No. 7,160,456 B2) discloses to anaerobically digest organic material to create a biogas containing carbon dioxide which can then be directed through a second reaction process containing a highly ammoniacal organic material, causing the complexation of carbon dioxide with ammoniacal nitrogen and resulting in a scrubbed biogas and a ammonium carbonate and/or ammonium bicarbonate sludge that can be recirculated to the anaerobic digestion system to provide alkaline buffering capacity. Therefore, the process disclosed by Järventie requires an anaerobic digestion system to provide carbon dioxide, said carbon dioxide is directed towards a single-stage reaction process in which ammoniacal nitrogen reacts with said carbon dioxide to form ammonium carbonate and/or ammonium bicarbonate, and said ammonium salts are used to provide alkalinity to the anaerobic digestion system from which the biogas originates. Our process does not require anaerobic digestion to provide carbon dioxide, it derives its ammoniacal nitrogen from an ammoniacal nitrogen-containing vapor, and it uses a dual scrubbing system to achieve the production of ammonium carbonate and/or ammonium bicarbonate. Furthermore, our process differs by isolating the resulting ammonium carbonate and/or ammonium bicarbonate rather than reintroducing it into a preceding process.

Harada et al. (U.S. Pat. No. 7,381,389 B2) discloses to extract and treat ammonia-containing gas through the use of a water-washing step followed by an ammonia stripping step to isolate and treat said gaseous ammonia. The water-washing step is comprised of a water cooling step and a water cleaning step in which water serves as an absorbent for the ammonia gas. These steps are conducted in series, and the ammonia-containing absorbent is then directed to a final ammonia treating step in which the ammonia gas is isolated for treatment. Our process differs from Harada et al. by treating both an ammoniacal nitrogen-containing vapor and carbon-dioxide containing vapor, as opposed to a single ammonia-containing gas, and further differs through the use of a dual-system process that simultaneously scrubs said vapors. In addition, our system produces ammonium carbonate and/or ammonium bicarbonate as an end product, whereas Harada et al. teaches the production of ammonia gas.

The precipitation of ammonia and carbon dioxide as ammonium carbonate and/or ammonium bicarbonate according to Burke (U.S. Pat. No. 7,811,455 B2) is a four part process in which a gas deficient in ammonia and carbon dioxide is passed through anaerobic digestate to strip it of its ammonia and carbon dioxide, the resulting ammonia and carbon-dioxide carrying gas is blended with biogas, the resulting blended gas is sent to a precipitation chamber where ammonium carbonate and/or ammonium bicarbonate is precipitated and recovered as a product, and a portion of the effluent gas, deficient in ammonia and carbon dioxide, is reused as stripping gas in the first step. Our process differs by maintaining an ammoniacal-nitrogen containing vapor and a carbon dioxide-containing vapor as two separate vapors, allowing for processing of said vapors without contamination or dilution. Furthermore, the individual delivery of ammoniacal-nitrogen containing vapor and carbon dioxide-containing vapor in our system allows for more precise control of ammonium carbonate and/or ammonium bicarbonate formation.

The recovery of ammonium salts according to Zhao et al. (U.S. Pat. No. 8,613,894 B2) is a three-step process consisting of heating and aerating anaerobic digester effluent to convert soluble ammonium to gaseous ammonia, delivering said gaseous ammonia to a stripping tower and combining with acid, and recovering ammonium salts from the stripping tower. Our process differs from Zhao et al. by deriving the acid necessary for ammonium salt recovery from an independent carbon dioxide-containing vapor. This has the benefit of reducing any costs associated with acid addition in the ammoniacal-nitrogen recovery process, and further allows for the simultaneous treatment of two independent vapors.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the waste processing system. Accordingly, these terms, as utilized to describe the present invention should be interpreted relative to a vehicle equipped with the waste processing system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A process for recovering ammoniacal nitrogen, in the form of ammonium carbonate and/or ammonium bicarbonate, from an ammoniacal nitrogen-containing vapor that comprises the following steps:
   introducing an ammoniacal nitrogen-containing vapor into at least one pressurizable ammonia scrubbing vessel containing water in order to produce an ammoniacal nitrogen-containing solution;
   simultaneously introducing a carbon dioxide-containing vapor into at least one pressurizable carbon dioxide scrubbing vessel containing water in order to produce a carbon dioxide-containing solution;
   simultaneously pumping the ammoniacal nitrogen-containing solution in the at least one pressurizable ammonia scrubbing vessel and the carbon dioxide-containing solution in the at least one carbon dioxide scrubbing vessel to and from the at least one pressurizable ammonia scrubbing vessel and the at least one pressurizable carbon dioxide scrubbing vessel in order to create an ammonium carbonate and/or ammonium bicarbonate mixture;
   recovering ammonium carbonate and/or ammonium bicarbonate for further use; and
   maintaining independent and unmixed vapor streams throughout the entire process.

2. The process according to claim 1, further comprising adding an ammoniacal nitrogen-containing solution to the ammonium carbonate and/or ammonium bicarbonate containing mixture being mixed between the scrubbing vessels in order to increase the concentration of ammonia in said ammonium carbonate and/or ammonium bicarbonate mixture.

3. The process according to claim 2, further comprising cooling the ammonium carbonate and/or ammonium bicarbonate containing mixture via mechanical and/or geothermal heat exchange.

4. The process according to claim 3, wherein the ammonium carbonate and/or ammonium bicarbonate mixture in the scrubbing vessels is maintained at or below 30° C.

5. The process according to claim 2, wherein the ammonium carbonate and/or ammonium bicarbonate containing mixture in said at least one pressurizable ammonia scrubbing vessel and said at least one pressurizable carbon dioxide scrubbing vessel is circulated within said at least one pressurizable ammonia scrubbing vessel and said at least one pressurizable carbon dioxide scrubbing vessel to produce a countercurrent flow of said ammonium carbonate and/or ammonium bicarbonate containing mixture to the incoming ammoniacal nitrogen-containing and/or carbon dioxide-containing vapor.

6. The process according to claim 5, wherein said at least one pressurizable ammonia scrubbing vessel and said at least one pressurizable carbon dioxide scrubbing vessel contains one or more of the following:
   packing material(s) that are synthetic and/or natural in composition; and/or sieve plates, impingement plates, bubble plates and/or valve plates that are synthetic and/or nature in composition.

7. The process according to claim 1, wherein the ammoniacal nitrogen-containing vapor is entrained in the ammonium carbonate and/or ammonium bicarbonate containing mixture prior to delivery to the at least one pressurizable ammonia scrubbing vessel.

8. The process according to claim 1, wherein the carbon dioxide-containing vapor is entrained in the ammonium carbonate and/or ammonium bicarbonate containing mixture prior to delivery to the at least one pressurizable carbon dioxide scrubbing vessel.

9. The process according to claim 1, wherein the at least one pressurizable ammonia scrubbing vessel is at least two pressurizable ammonia scrubbing vessels that operate in series and/or in parallel.

10. The process according to claim 1, wherein the at least one pressurizable carbon dioxide scrubbing vessel is at least two pressurizable carbon dioxide scrubbing vessels that operate in series and/or in parallel.

11. The process according to claim 1, wherein the introduction of the carbon dioxide-containing vapor into the at least one pressurizable carbon dioxide scrubbing vessel is monitored and controlled in order or provide a quantity of carbon dioxide that approximates the stoichiometric ratio of accumulating ammoniacal nitrogen in the at least one pressurizable ammonia scrubbing vessel that is necessary for the formation of ammonium carbonate and/or ammonium bicarbonate in the scrubber solution.

12. The process according to claim 1, wherein the ammoniacal nitrogen-containing vapor is recirculated to the at least one pressurizable ammonia scrubbing vessel in order to further reduce a proportion of ammoniacal nitrogen present in said ammoniacal nitrogen-containing vapor.

13. The process according to claim 1, wherein the carbon dioxide-containing vapor is recirculated to the at least one pressurizable carbon dioxide scrubbing vessel in order to further reduce a proportion of carbon dioxide present in said carbon dioxide containing vapor.

14. The process according to claim 1, wherein recovery of a concentrated liquid ammonium carbonate and/or ammonium bicarbonate mixture and/or a solid ammonium carbonate and/or ammonium bicarbonate is accomplished via gravity settling, centrifusion, and/or filtration.

15. The process according to claim 14, wherein water resulting from said settling, centrifusion, and/or filtration is returned to the at least one pressurizable ammonia scrubbing vessel and the at least one pressurizable carbon dioxide scrubbing vessel for further use.

* * * * *